(12) United States Patent
Golembiewski et al.

(10) Patent No.: US 11,904,912 B2
(45) Date of Patent: Feb. 20, 2024

(54) BREAK BEAM WEAR GUIDE

(71) Applicant: Standard Car Truck Company, Rosemont, IL (US)

(72) Inventors: Ronald D. Golembiewski, Chicago, IL (US); Walter J. Peach, Montgomery, IL (US)

(73) Assignee: STANDARD CAR TRUCK COMPANY, Rosemont, IL (US)

( * ) Notice: Subject to any disclaimer, the term of this patent is extended or adjusted under 35 U.S.C. 154(b) by 35 days.

(21) Appl. No.: 17/644,316

(22) Filed: Dec. 14, 2021

(65) Prior Publication Data

US 2022/0105968 A1  Apr. 7, 2022

Related U.S. Application Data

(62) Division of application No. 16/554,953, filed on Aug. 29, 2019, now Pat. No. 11,230,305.

(60) Provisional application No. 62/731,558, filed on Sep. 14, 2018.

(51) Int. Cl.
  *B61H 13/36* (2006.01)
  *B61H 15/00* (2006.01)

(52) U.S. Cl.
  CPC ......... *B61H 13/36* (2013.01); *B61H 15/0035* (2013.01)

(58) Field of Classification Search
  CPC .... B61H 15/0035; B61H 15/00; B61H 13/36; B61H 1/00; B61F 5/50; B61F 5/52; B60B 17/0065; B60B 2900/3316; B60T 17/228; F16D 66/02; F16D 2066/003
  USPC ........................ 188/270, 233.3, 52
  See application file for complete search history.

(56) References Cited

U.S. PATENT DOCUMENTS

| | | | |
|---|---|---|---|
| 1,913,171 A | 6/1933 | Schaefer | |
| 2,067,596 A * | 1/1937 | Busse | B61H 13/36 188/213 |
| 2,350,671 A | 6/1944 | Busch | |
| 2,365,744 A | 12/1944 | Busch | |
| 2,525,762 A | 10/1950 | Baselt | |
| 2,553,345 A | 5/1951 | Willis | |
| 2,723,008 A | 11/1955 | Cottrell | |
| 2,808,906 A | 10/1957 | Busch | |

(Continued)

FOREIGN PATENT DOCUMENTS

| | | |
|---|---|---|
| AU | 143976 S | 10/1951 |
| CA | 577032 A | 6/1959 |

(Continued)

OTHER PUBLICATIONS

ISA Korean Intellectual Property Office, International Search Report Issued in Application No. PCT/US2019/050371, dated Dec. 23, 2019, WIPO, 3 pages.

(Continued)

Primary Examiner — Robert A. Siconolfi
Assistant Examiner — San M Aung
(74) Attorney, Agent, or Firm — McCoy Russell LLP

(57) ABSTRACT

Various embodiments provided a railroad car brake beam wear guide for mounting in a brake beam guide bracket of a railroad car truck side frame and including a spacer that partially defines a slide-way for a brake beam lug of a brake beam and that limits lateral movement of the brake beam. In various embodiments, the wear guide can be employed for other uses besides for railroad cars.

14 Claims, 18 Drawing Sheets

(56) References Cited

U.S. PATENT DOCUMENTS

| | | | |
|---|---|---|---|
| 2,918,149 A | 12/1959 | Mcclure et al. | |
| 3,020,984 A | 2/1962 | Beau | |
| 3,092,215 A | 6/1963 | Haydu | |
| 3,094,196 A | 6/1963 | Sweger | |
| 3,207,271 A | 9/1965 | Polanin et al. | |
| 3,424,503 A | 1/1969 | Schulz | |
| 4,079,818 A * | 3/1978 | Chierici | B61H 13/38 |
| | | | 188/207 |
| 4,094,253 A | 6/1978 | Gage | |
| 4,133,434 A | 1/1979 | Chierici | |
| 4,471,857 A | 9/1984 | Murphy | |
| 4,480,721 A | 11/1984 | Murphy | |
| 4,784,068 A | 11/1988 | Burke | |
| 4,917,021 A | 4/1990 | Murphy | |
| 5,421,437 A | 6/1995 | Malachowski | |
| 5,598,936 A | 2/1997 | Murphy | |
| 5,682,964 A | 11/1997 | Murphy | |
| 5,924,654 A | 7/1999 | Anderson | |
| 6,142,082 A | 11/2000 | Burke et al. | |
| 6,367,590 B1 | 4/2002 | Burke | |
| D497,838 S | 11/2004 | Anderson | |
| 8,033,768 B2 | 10/2011 | Anderson | |
| 8,256,585 B2 | 9/2012 | Halford et al. | |
| 8,474,578 B2 | 7/2013 | Halford et al. | |
| 8,668,059 B2 | 3/2014 | De La Fuente-Farias et al. | |
| 8,869,709 B2 | 10/2014 | East et al. | |
| 8,869,954 B2 | 10/2014 | Varlow et al. | |
| 2011/0259685 A1 | 10/2011 | De-La-Fuente-Farias et al. | |
| 2012/0037032 A1 * | 2/2012 | Halford | B61F 5/50 |
| | | | 105/182.1 |
| 2012/0037033 A1 * | 2/2012 | Halford | B61F 5/06 |
| | | | 105/182.1 |
| 2012/0261218 A1 | 10/2012 | Marlow et al. | |
| 2013/0333990 A1 | 12/2013 | Compton | |

FOREIGN PATENT DOCUMENTS

| | | |
|---|---|---|
| CN | 106114544 A | 11/2016 |
| WO | 2015131013 A1 | 9/2015 |

OTHER PUBLICATIONS

ISA Korean Intellectual Property Office, Written Opinion of the International Searching Authority Issued in Application No. PCT/US2019/050371, dated Dec. 23, 2019, WIPO, 5 pages.

* cited by examiner

BREAK BEAM WEAR GUIDE

CROSS REFERENCE TO RELATED APPLICATIONS

The present application is a divisional of U.S. Non-Provisional patent application Ser. No. 16/554,953, filed Aug. 29, 2019. U.S. Non-Provisional patent application Ser. No. 16/554,953 claims priority to and the benefit of U.S. Provisional Patent Application No. 62/731,558, filed Sep. 14, 2018, the entire contents of which is incorporated herein by reference.

BACKGROUND

Various conventional vehicles (such as freight railroad cars) in North America and other parts of the world include a car body and two spaced apart trucks. The car body (or car body under frame) includes two spaced apart center plates that respectively rest on and are rotatably received by respective bolster bowls of the two trucks. The trucks rollingly support the car body on tracks along a path. Each truck includes two spaced apart parallel side frames and a bolster. The side frames generally extend in the same direction as the tracks, and the bolster generally extends transversely or laterally to the tracks. Each side frame defines a center opening and pedestal jaw openings on each side of the center opening. The bolster extends laterally through and between and is supported by the two spaced apart side frames. Each end of each bolster is supported by a spring group positioned in the center opening of the respective side frame and supported by the lower portion of the side frame that defines the center opening. Each truck also includes two wheel sets that each include an axle that supports the side frames, two wheels, and two roller bearing assemblies respectively mounted on the ends of the axle.

Each truck further includes two interconnected braking mechanisms. More specifically, as shown in FIG. 1, each braking mechanism (such as braking mechanism 20) of each truck (such as Truck 2) includes a laterally or transversely extending brake beam (such as brake beam 22) and spaced apart brake shoes (such as brake shoe 24) for respectively engaging the wheels (such as Wheel 16) of one of the wheel sets of the truck to apply braking forces to those wheels. Each side frame (such as side frame 4) includes two spaced apart inwardly extending brake beam guide brackets (such as brake beam guide brackets 6 and 7). The side frames are cast steel or iron and the brake beam guide brackets are cast into the rest of the side frames. Each brake beam guide bracket defines a generally U-shaped pocket configured to receive a brake beam wear guide. Steel or plastic brake beam wear guides (such as brake beam wear guides 8 and 9) are respectively mounted in the brake beam guide brackets to guide the movements of the respective opposite ends of the brake beam (such as brake beam 22). The respective opposite ends of the brake beam are referred to in the industry as lugs, paddles, or heads, and are referred to herein as a "lug" or a "brake beam lug"). This brake beam and the lugs at each end of the brake beam are made of steel.

Various known brake mechanisms tend to allow certain amounts of lateral movement of the brake beam 22. When a brake beam 22 moves off center laterally toward one of the side frames, one of the brake shoes (attached to that brake beam) tends to overhang the engagement surface of one of the wheels (such as surface 16a of wheel 16) and the other one of the brake shoes (attached to that brake beam) tends to contact the flange of the other one of the wheels (such as flange 16b of the wheel 16). This is generally shown in FIG. 2 where the braking mechanisms 20A and 20B (and the brake beams 22A and 22B) are generally shown to shift laterally and cause a misalignment with the wheels sets 15A and 15B of the truck. The combination of asymmetric tread wear from a brake shoe on an engagement surface of a wheel and the asymmetric flange contact by a brake shoe on a wheel flange adversely affects the wheel set steering properties on tangent railroad track and otherwise. For instance, this can result in asymmetric wheel flange wear that occurs on diagonally opposite wheels in each truck.

To address this problem, plastic brake beam wear guides including thickened end walls have been employed to limit lateral movement of the brake beam. However, when known plastic brake beam wear guides (including plastic wear guides with thickened end walls) are employed in geographic areas where sand and dust storms are prevalent, they tend to need relatively quick replacement because the sand causes excess wear on the plastic brake beam wear guides.

Also, to address this problem, steel brake beam wear guides including centering fingers have also been employed to limit lateral movement of the brake beam. When known steel brake beam wear guides with centering fingers at the end wall of the wear guide are employed, the centering fingers tend to break off over time.

Thus, there is a need to address these problems.

SUMMARY

The present disclosure provides a wear guide such as a brake beam wear guide, and particularly a railroad car brake beam wear guide that overcomes the above problems.

The brake beam wear guide of various embodiments the present disclosure includes: (1) a substantially U-shaped steel member having first and second spaced apart lower walls connected by an end wall; and (2) a spacer including a polymer insert suitably integrally attached (such as by bonding, gluing, or fastening) to the interior surface of the end wall of the U-shaped steel member. This spacer assists in restricting the lateral movement of the brake beam (i.e., limiting side-to-side movement of the brake beam and thus the side-to-side movement of brake shoes attached to that brake beam) relative to the wheels of a wheel set of the truck.

The brake beam wear guide of various other embodiments the present disclosure includes: (1) a substantially U-shaped steel member having upper and lower walls connected by an end wall; and (2) wherein the end wall is configured to function as a spacer. This spacer assists in restricting the lateral movement of the brake beam (i.e., limiting side-to-side movement of the brake beam and thus the side-to-side movement of brake shoes attached to that brake beam) relative to the wheels of a wheel set of the truck.

It should be appreciated that the wear guide of the present disclosure can be employed in other suitable manners and for other suitable uses than for railroad cars and railroad car trucks.

Other objects, features, and advantages of the present disclosure will be apparent from the following detailed disclosure, taken in conjunction with the accompanying sheets of drawings, wherein like reference numerals refer to like parts.

DETAILED DESCRIPTION

Figure 1:
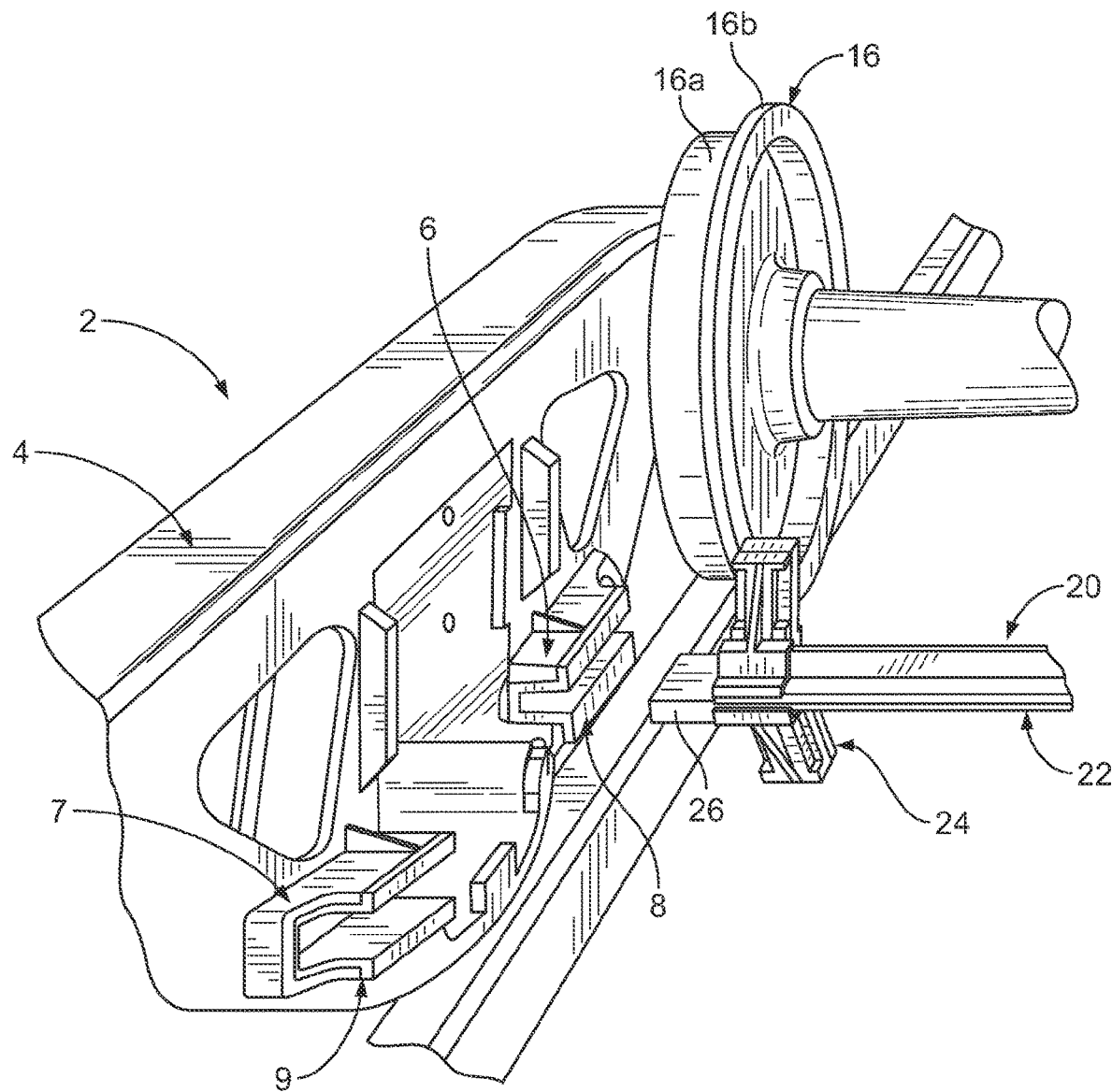
FIG. 1 is a fragmentary exploded view of certain known components of an example known railroad car truck.
Figure 2:
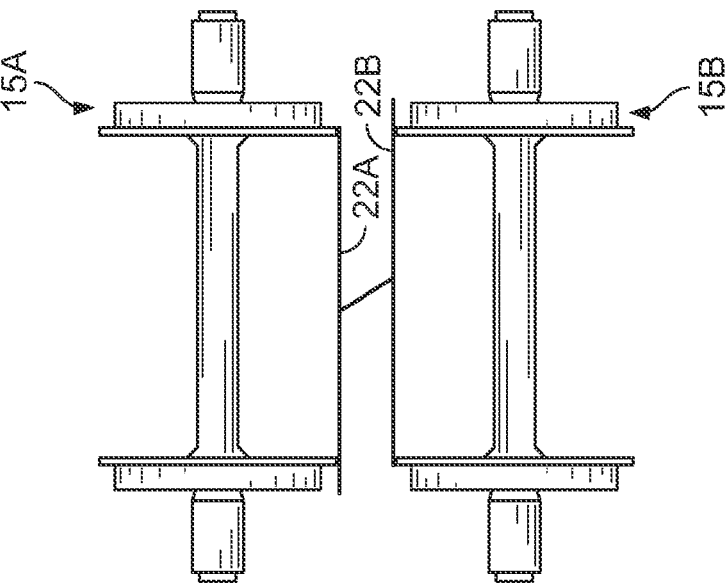
FIG. 2 shows enlarged diagrammatic top views of certain parts of a railroad car brake mechanism and wheel sets of a railroad car truck, generally illustrating the tendency of the brake beams of braking mechanisms to laterally shift and cause misalignment of the brake shoes with the wheels of the wheel sets.
Figure 2:
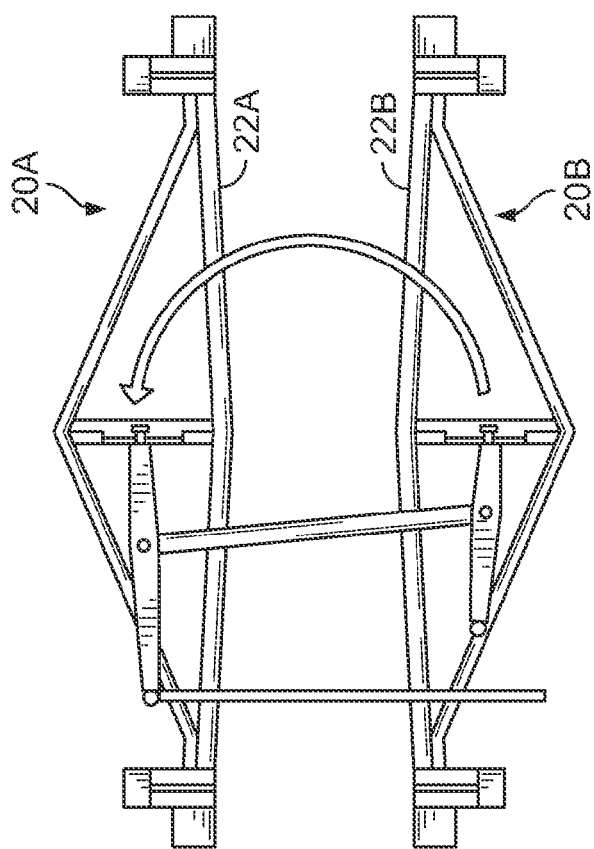
Figure 3:
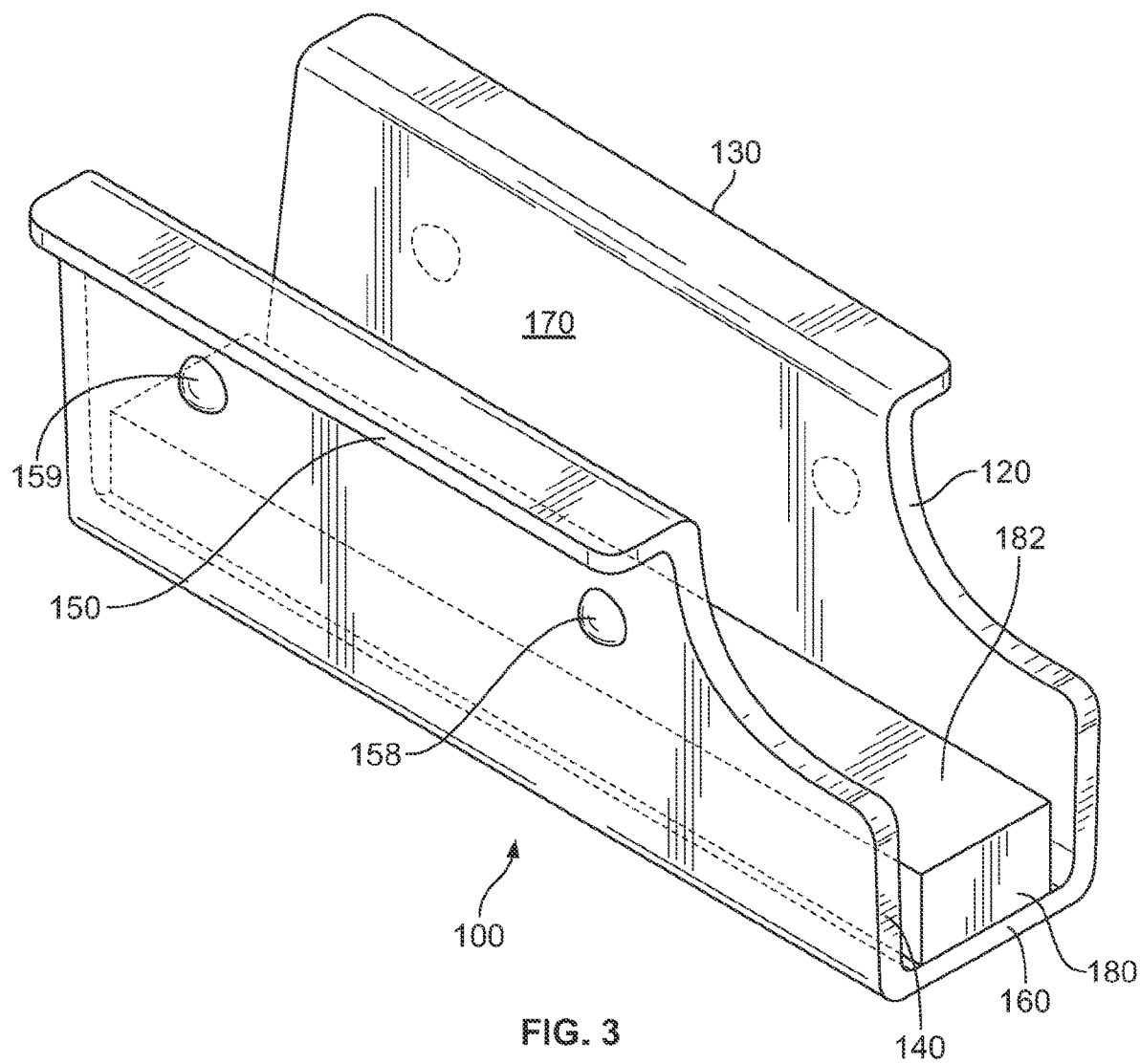
FIG. 3 is a first enlarged perspective view of the brake beam wear guide of one example embodiment of the present disclosure, showing a part of the spacer of the brake beam wear guide in phantom.
Figure 4:
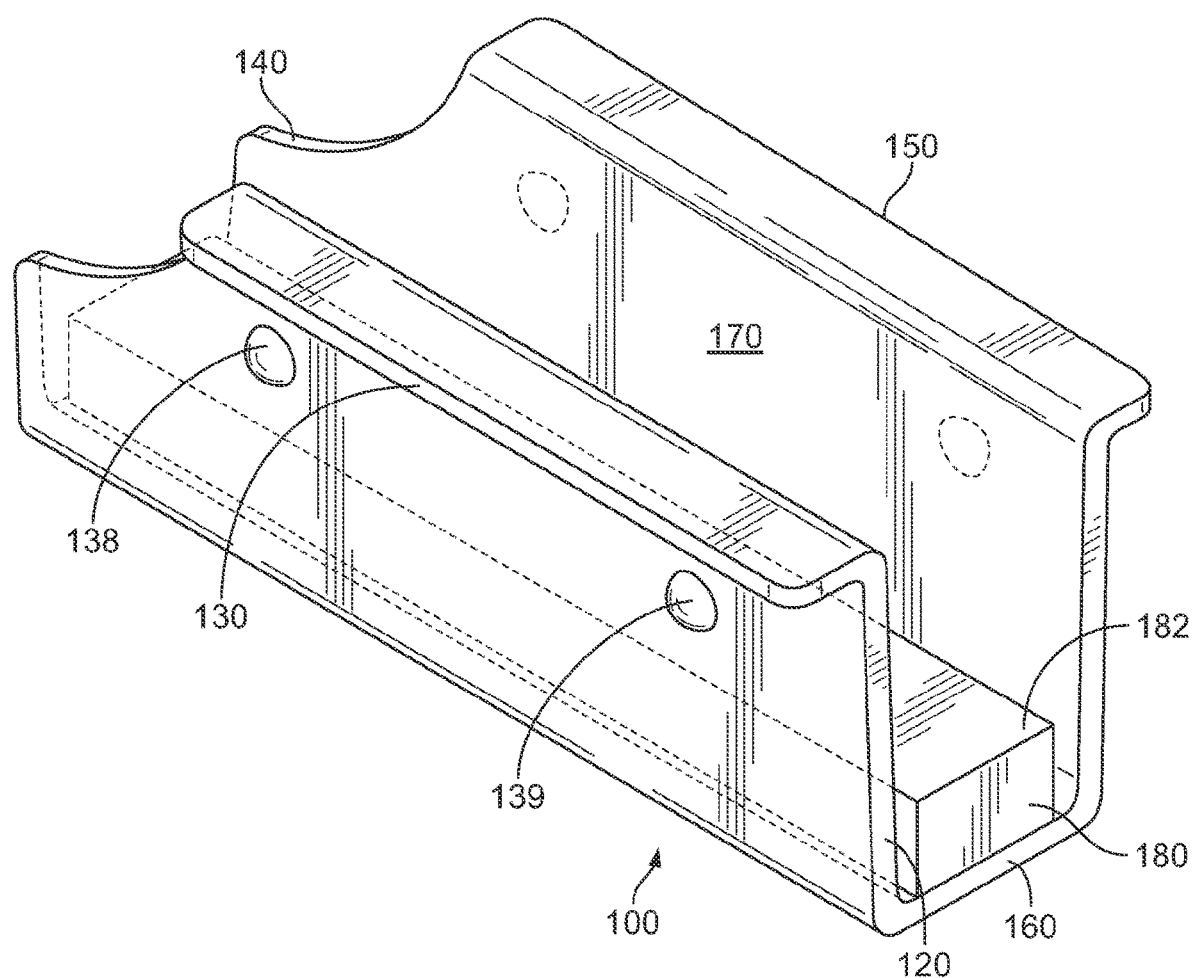
FIG. 4 is a second enlarged perspective view of the brake beam wear guide of FIG. 3, showing a part of the spacer of the brake beam wear guide in phantom.
Figure 5:
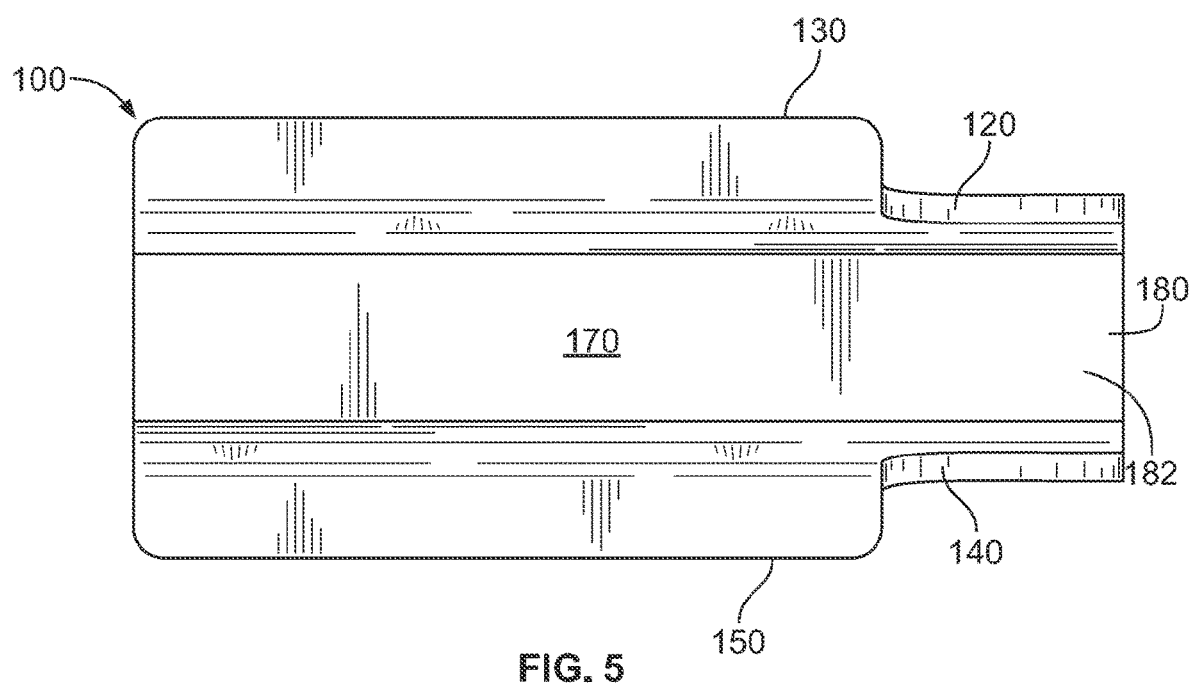
FIG. 5 is an enlarged top view of the brake beam wear guide of FIG. 3.
Figure 6:
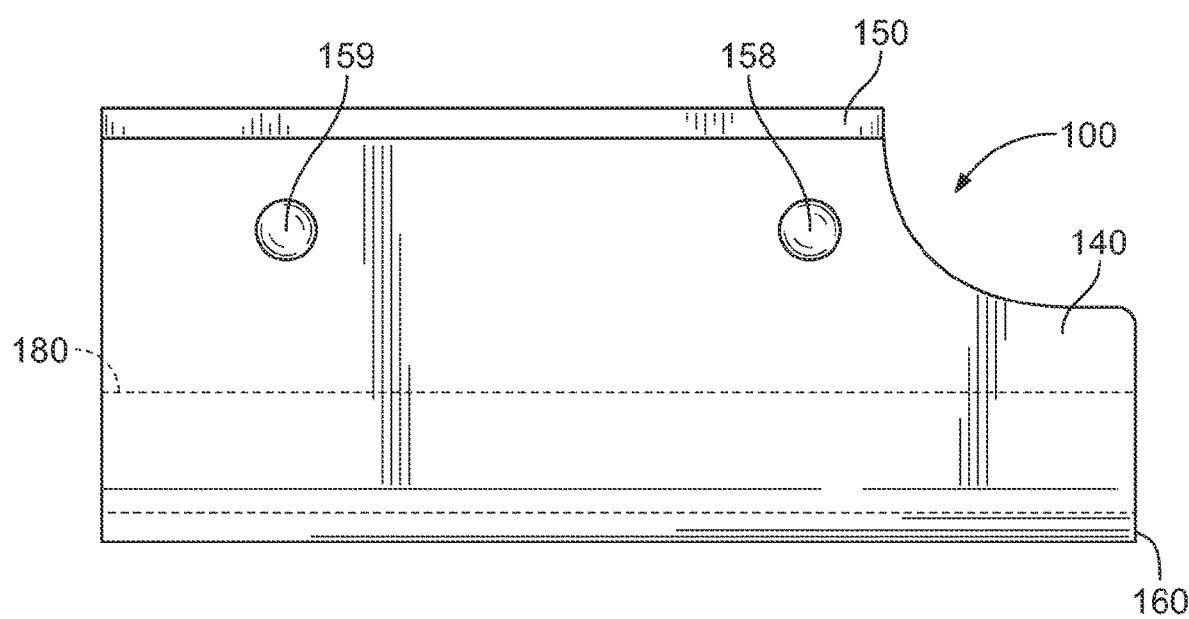
FIG. 6 is an enlarged side view of the brake beam wear guide of FIG. 3, showing the spacer of the brake beam wear guide in phantom.
Figure 7:
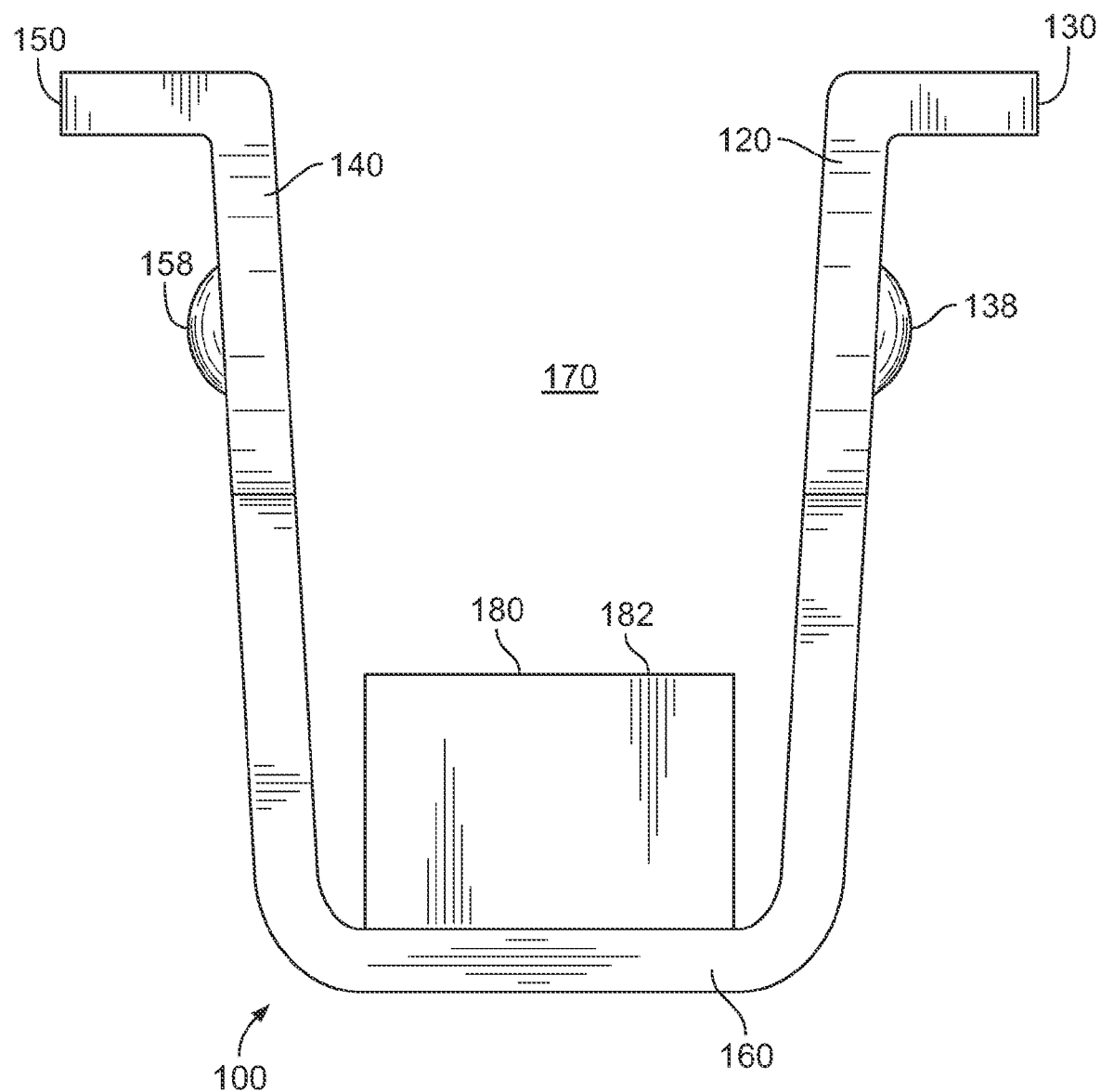
FIG. 7 is an enlarged first end view of the brake beam wear guide of FIG. 3.
Figure 8:
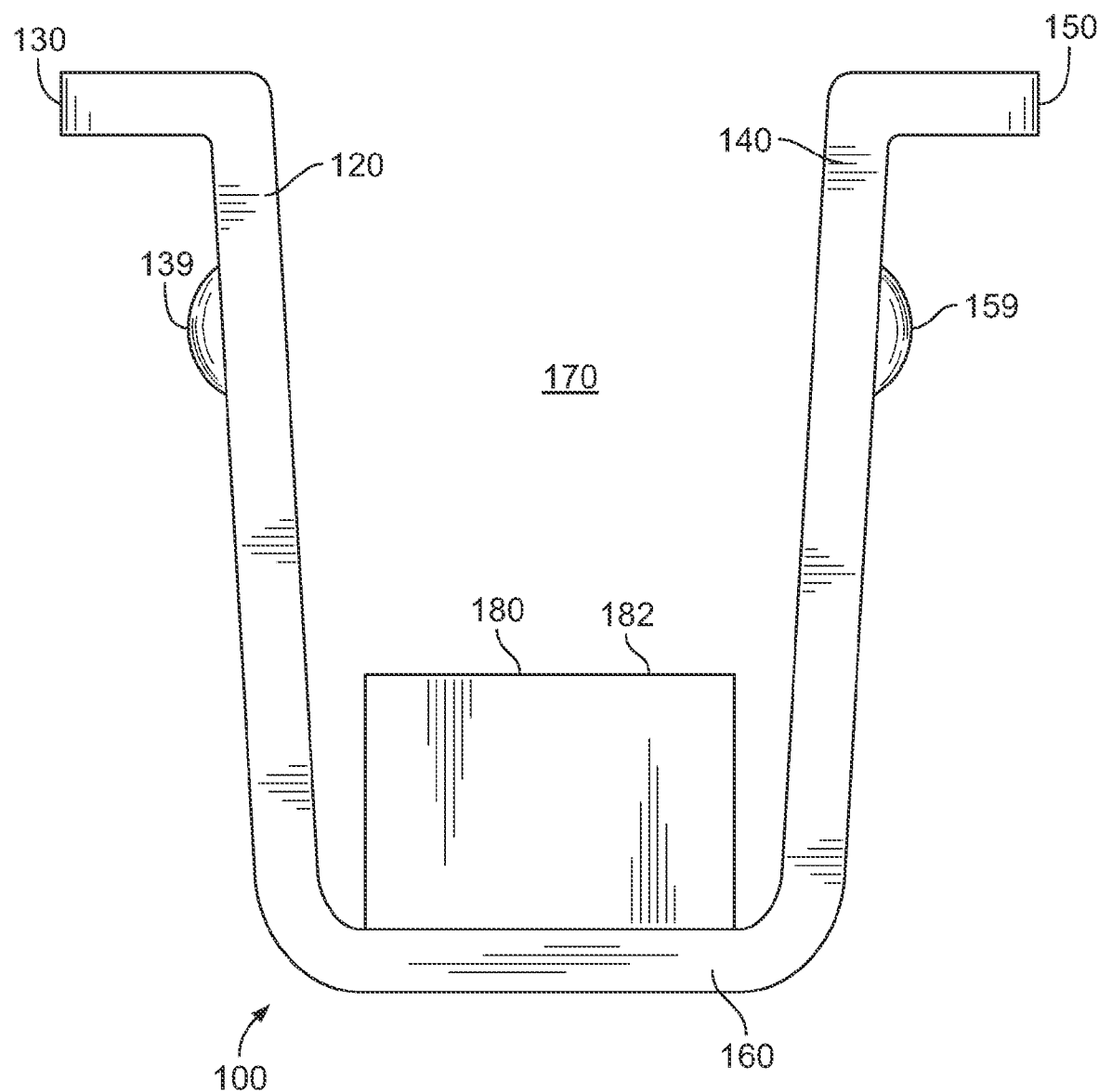
FIG. 8 is an enlarged second end view of the brake beam wear guide of FIG. 3.
Figure 9:
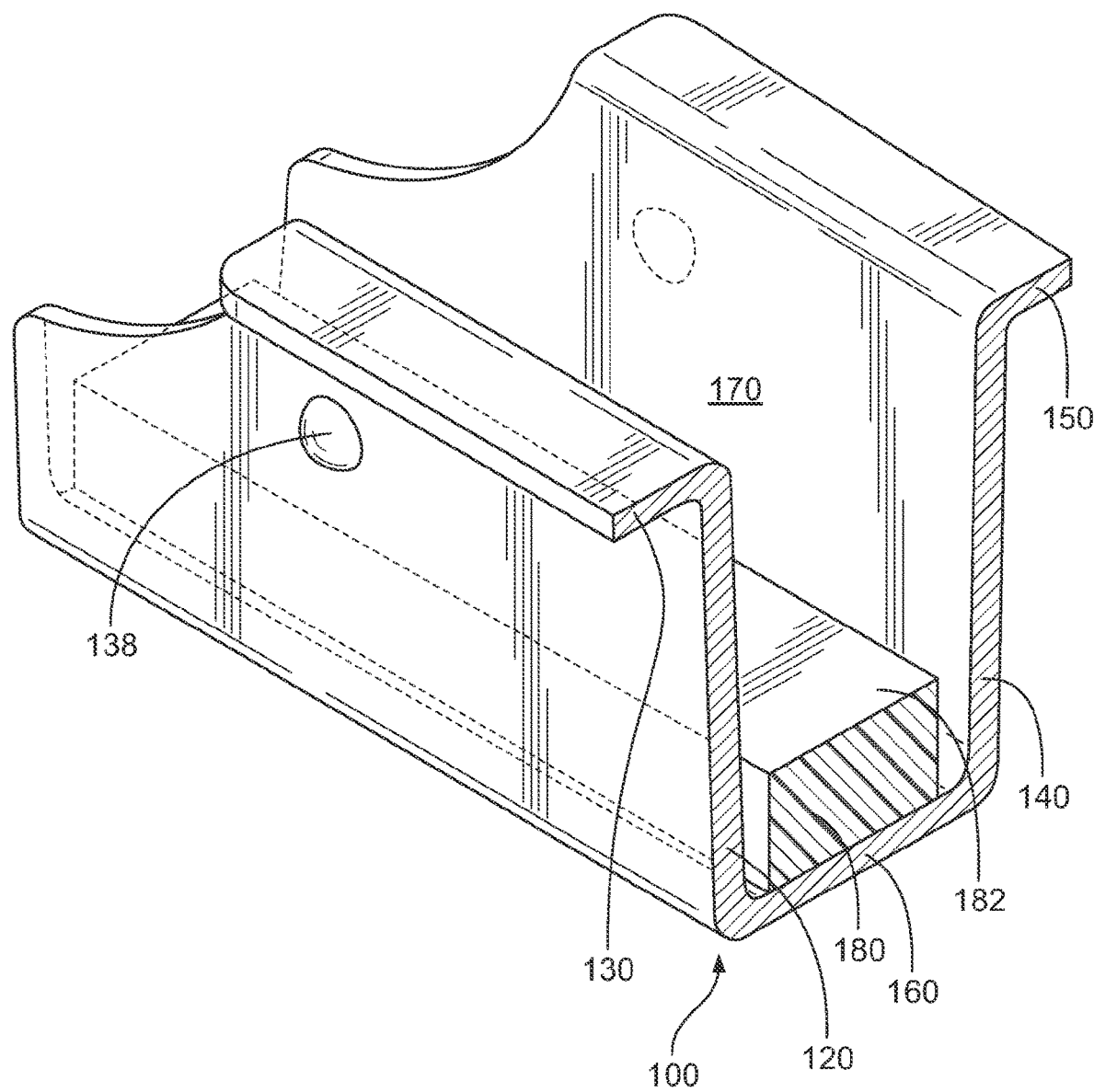
FIG. 9 is an enlarged cross-sectional view of the brake beam wear guide of FIG. 3, showing a part of the spacer of the brake beam wear guide in phantom.
Figure 10:
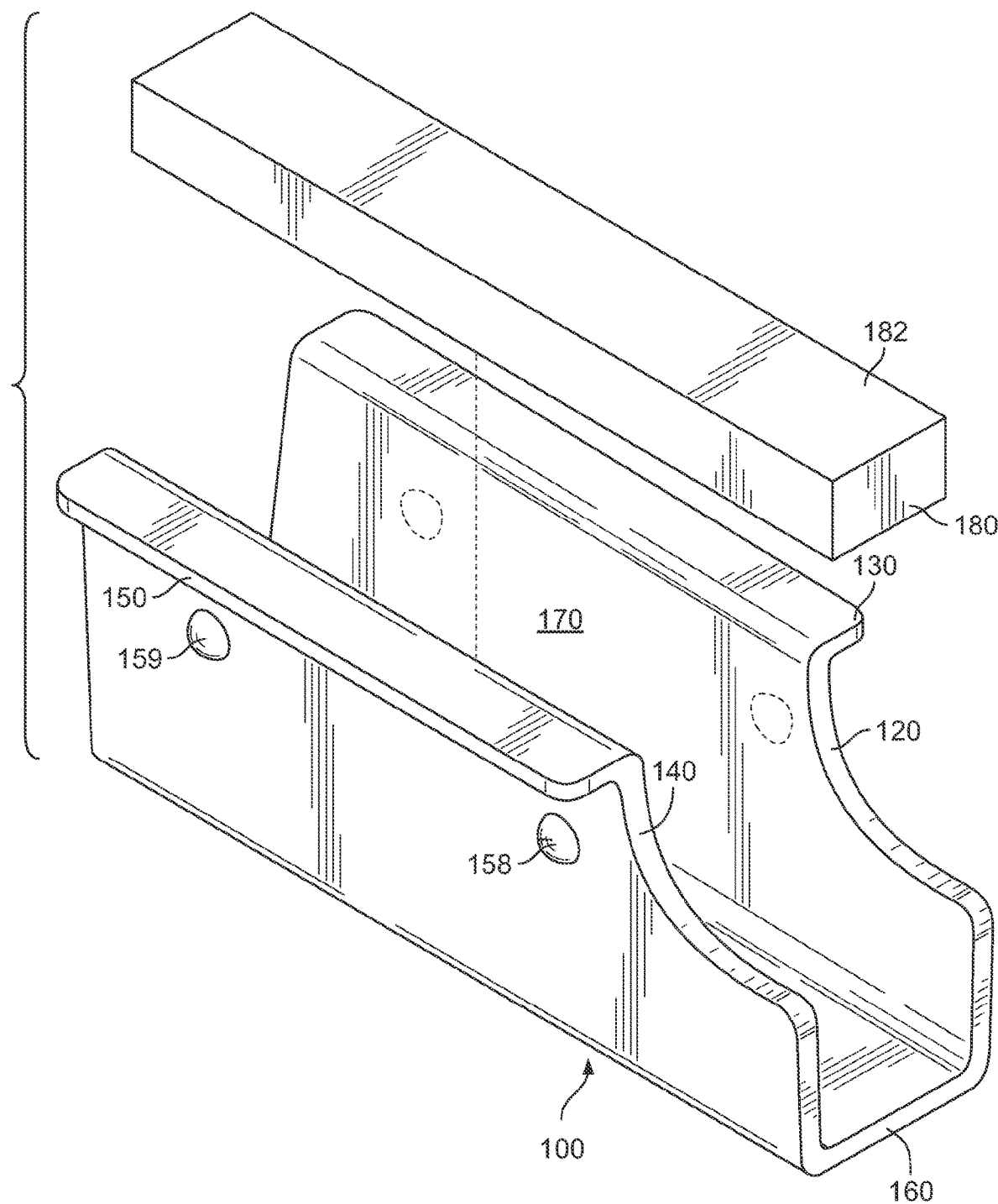
FIG. 10 is an enlarged exploded perspective view of the brake beam wear guide of FIG. 3.
Figure 11:
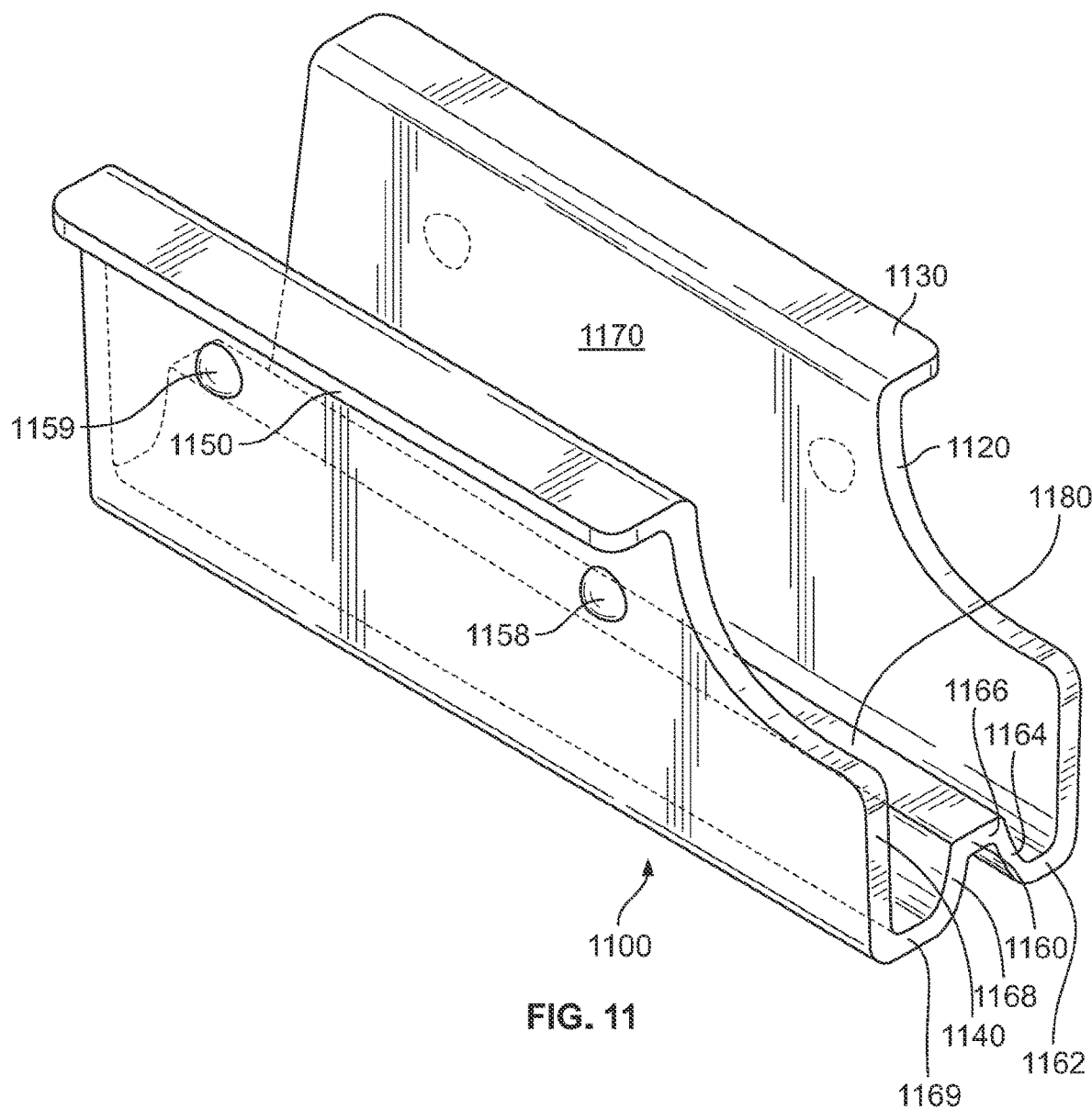
FIG. 11 is a first enlarged perspective view of the brake beam wear guide of another example embodiment of the present disclosure, showing a part of the spacer of the brake beam wear guide in phantom.
Figure 12:
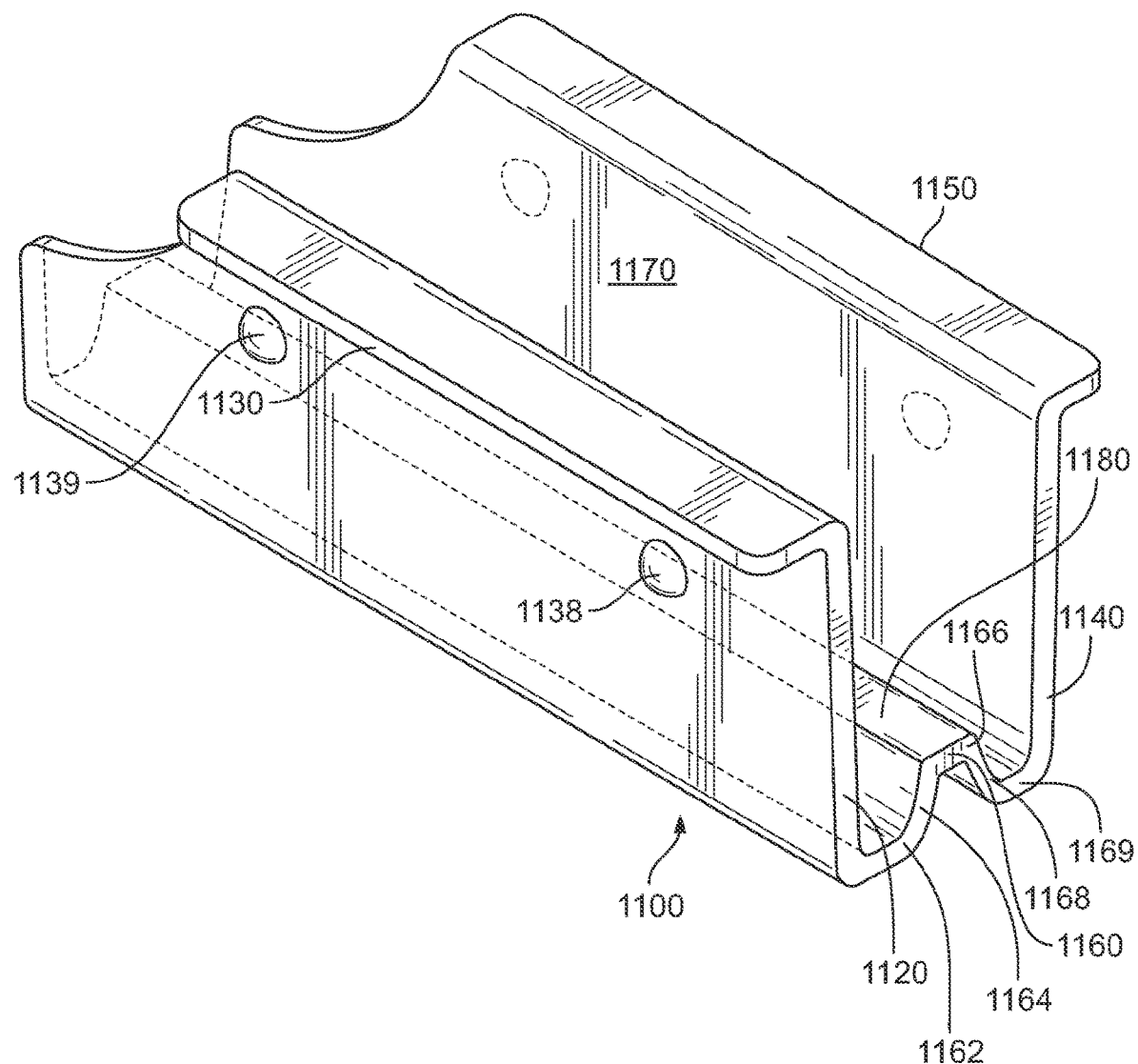
FIG. 12 is a second enlarged perspective view of the brake beam wear guide of FIG. 11, showing a part of the spacer of the brake beam wear guide in phantom.
Figure 13:
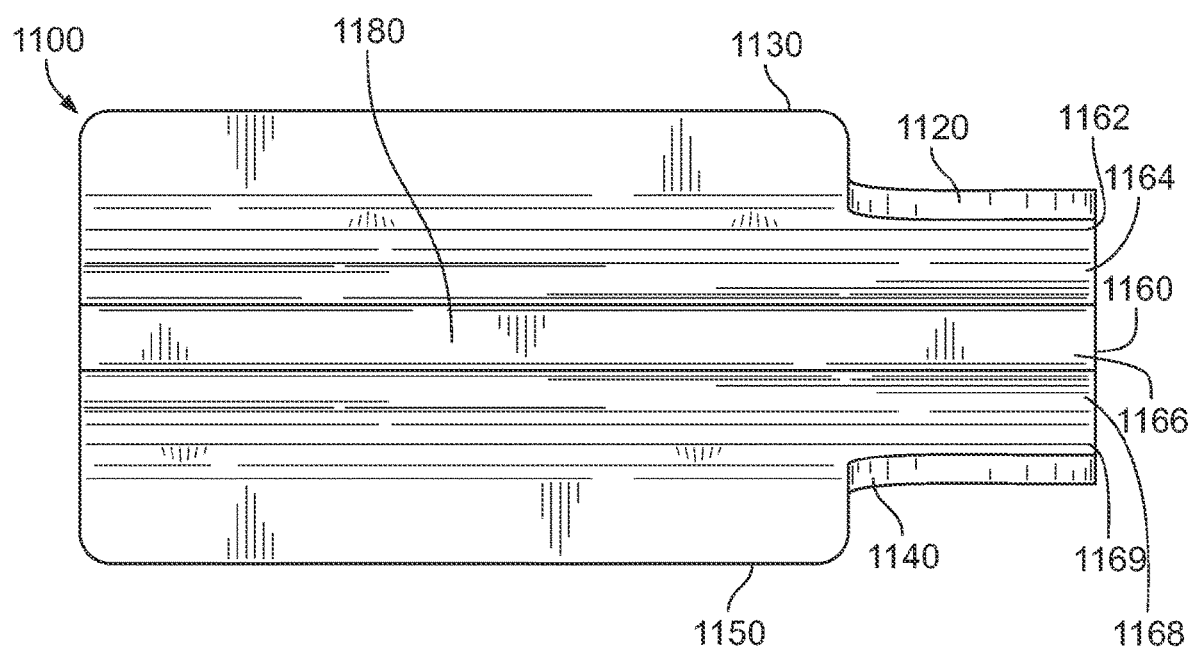
FIG. 13 is an enlarged top view of the brake beam guide of FIG. 11.
Figure 14:
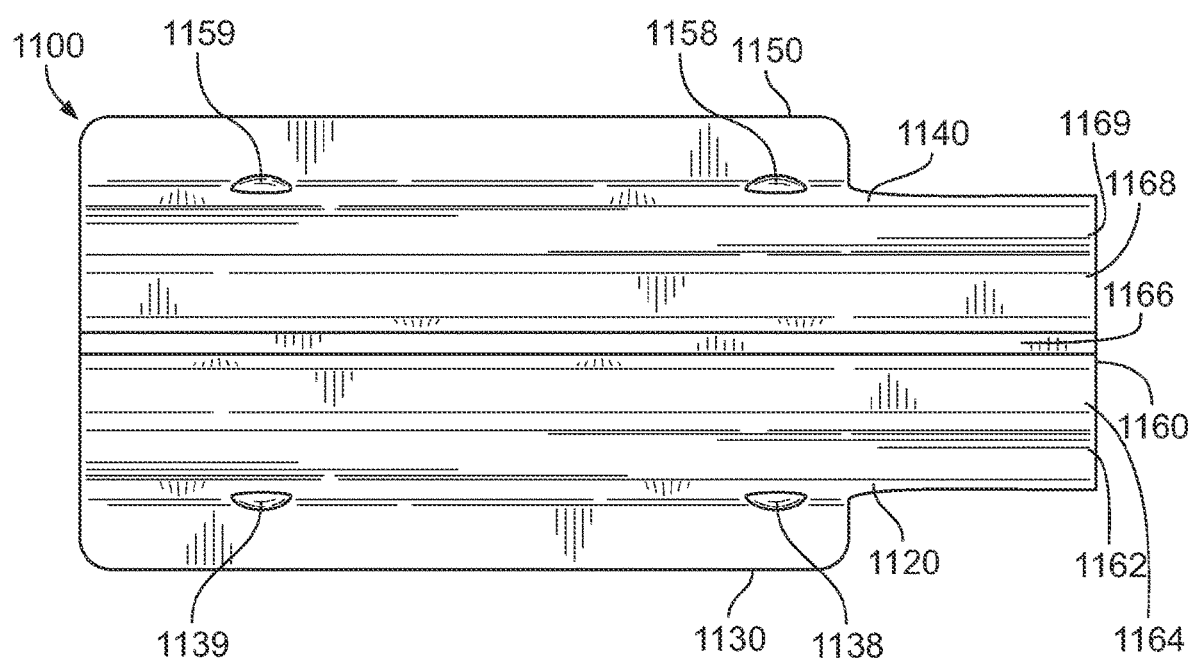
FIG. 14 is an enlarged bottom view of the brake beam guide of FIG. 11.
Figure 15:
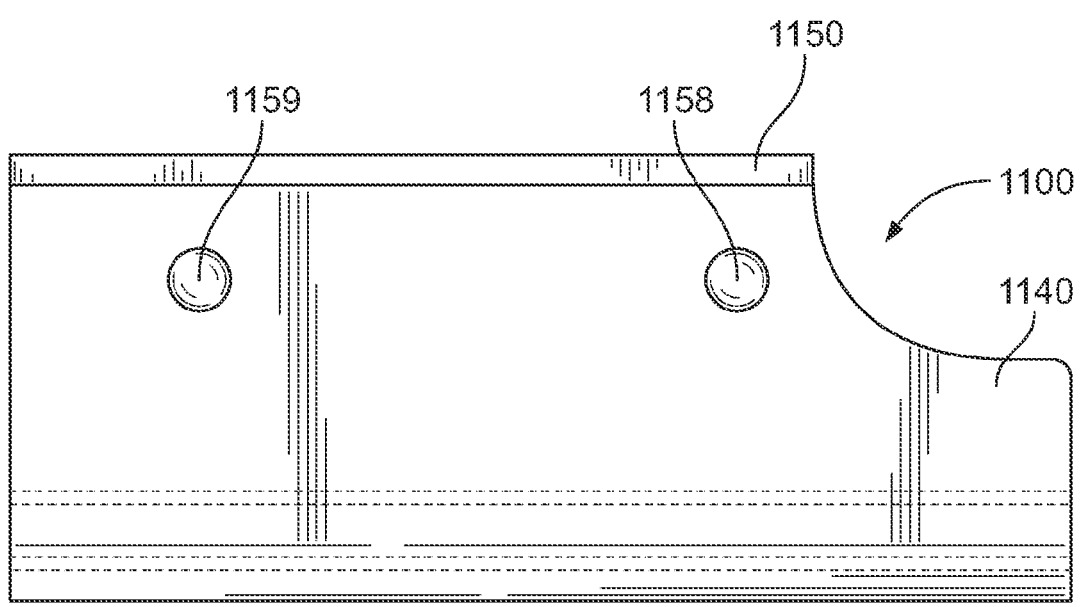
FIG. 15 is an enlarged side view of the brake beam wear guide of FIG. 11, showing a part of the spacer of the brake beam wear guide in phantom.
Figure 16:
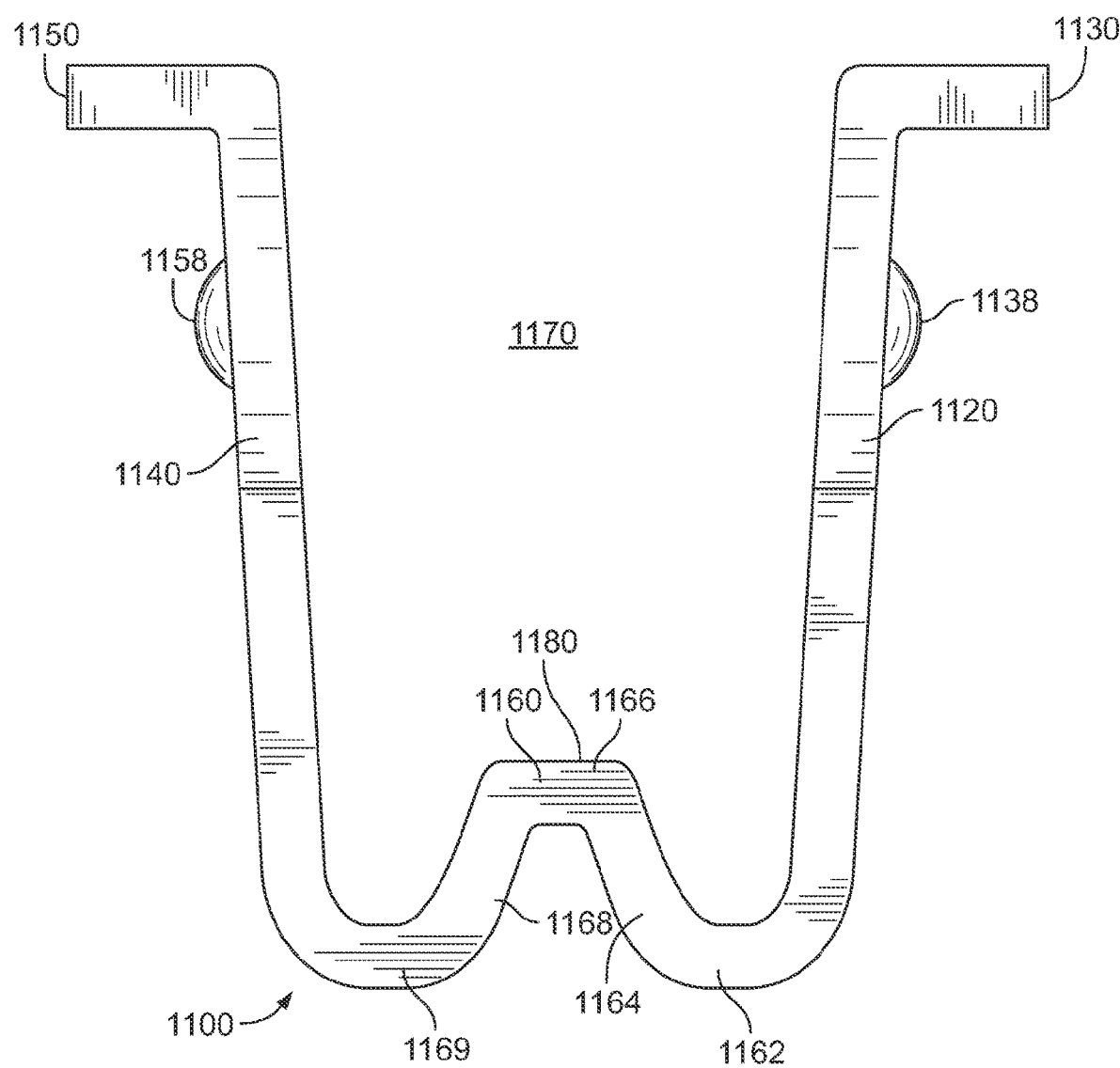
FIG. 16 is an enlarged first end view of the brake beam wear guide of FIG. 11.
Figure 17:
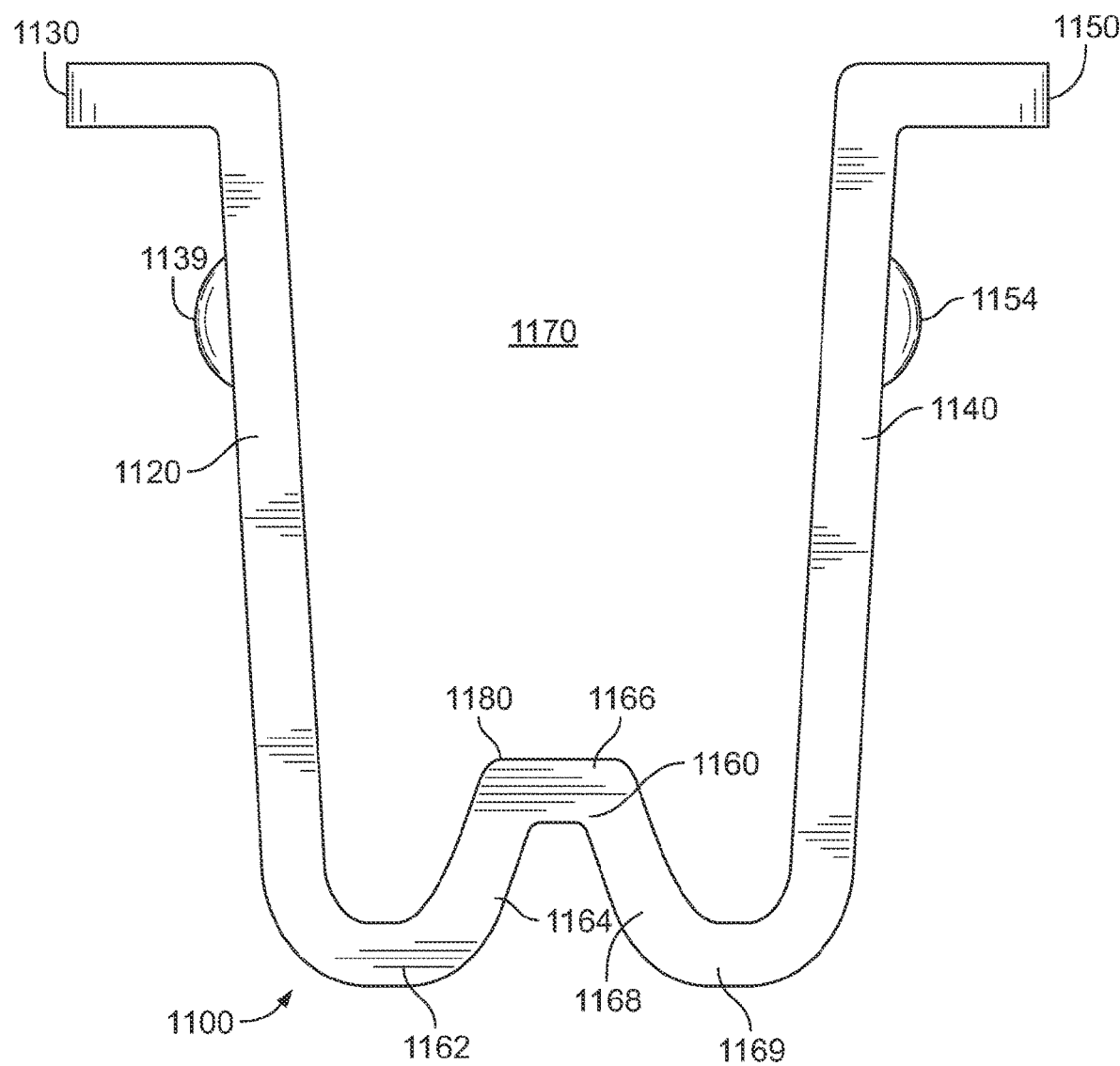
FIG. 17 is an enlarged second end view of the brake beam wear guide of FIG. 11.
Figure 18:
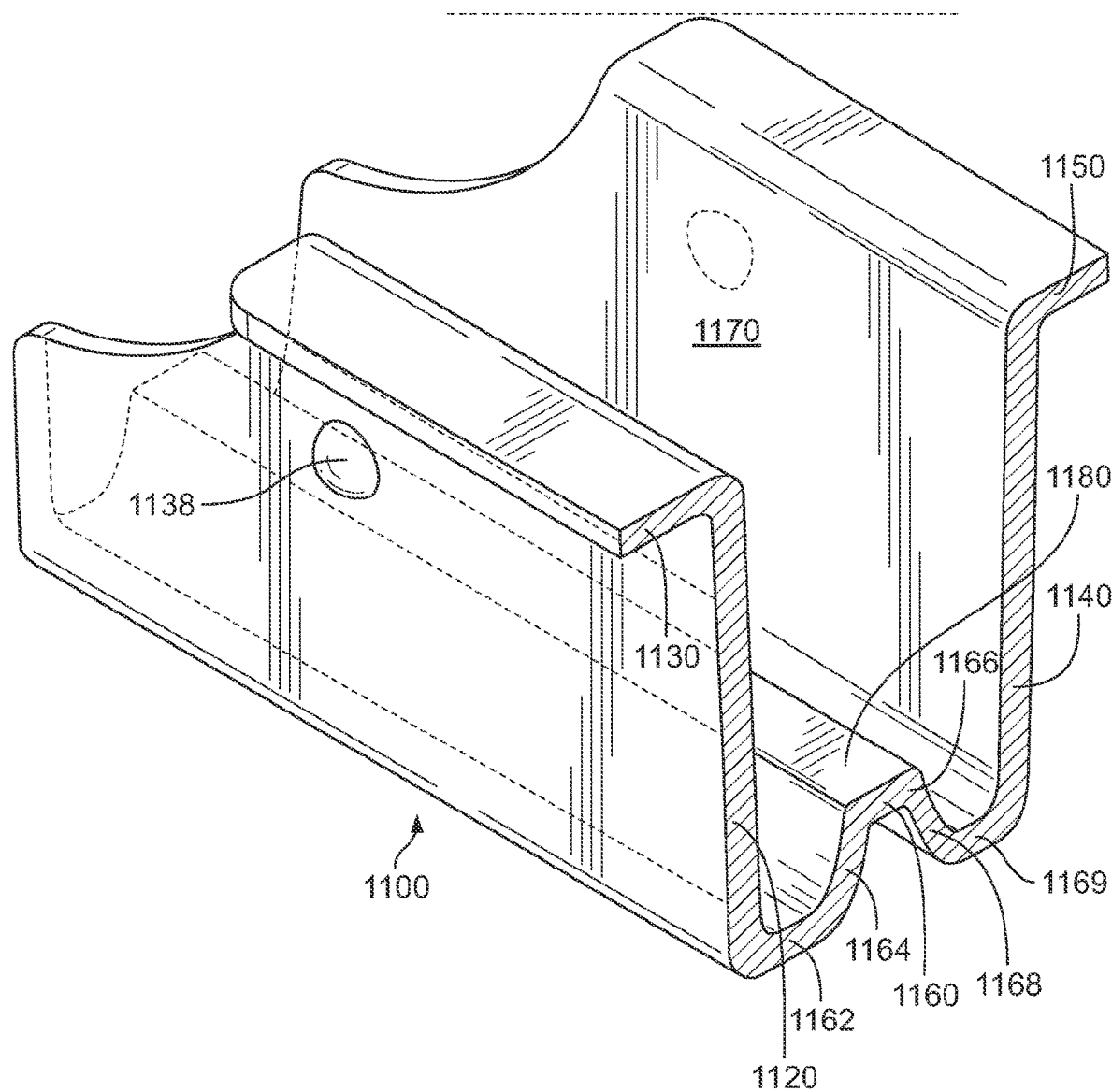
FIG. 18 is an enlarged cross-sectional view of the brake beam wear guide of FIG. 11, showing a part of the spacer of the brake beam wear guide in phantom.

While the systems, devices, and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

Various embodiments of the present disclosure provide a new brake beam wear guide for a truck such as a railroad car truck, a new car truck such as a new railroad car truck having one or more new brake beam wear guides, and a new vehicle such as a railroad car having one or more new railroad car trucks with one or more new brake beam wear guides. It should also be appreciated that the wear guide of the present disclosure can be employed for other suitable purposes.

Directions and orientations that may be used herein refer to the normal orientation of a vehicle such as a railroad car in use. Thus, unless the context clearly requires otherwise, the "longitudinal" axis or direction is substantially parallel to straight tracks and in the direction of movement of the vehicle on the tracks in either direction. The "lateral" axis or direction is in a traverse direction substantially perpendicular to the longitudinal axis and the straight tracks. "Vertical" is the up-and-down direction, and "horizontal" is a plane parallel to the tracks including the transverse and longitudinal axes. The "front" or "leading" side of the truck means the first side of a truck of a vehicle to encounter a turn; and the "rear" or "trailing" side is opposite the leading side.

FIGS. 3 to 10 illustrate one example embodiment of a new wear guide such as a new railroad car brake beam wear guide of the present disclosure. This brake beam wear guide is generally indicated by numeral 100. In this illustrated example embodiment, the brake beam wear guide 100 is configured to be positioned in a brake beam guide bracket of a railroad car truck side frame such as in either of the brake beam guide brackets 6 or 7 of side frame 4 shown in FIG. 1. For purposes of understanding the brake beam wear guide of the present disclosure, only a portion of a railroad car truck is needed to be illustrated in FIG. 1.

For purposes of understanding the example illustrated brake beam wear guides of the present disclosure, the brake beam wear guides are shown in a rotated or in an upright position in the figures but described in terms of the orientation in which they will be inserted into or mounted in respective brake beam guide brackets (such as brake beam guide brackets 6 or 7).

This example brake beam wear guide 100 of the present disclosure is illustrated in greater detail in FIGS. 3 to 10 prior to being mounted in the pocket of a brake beam guide bracket. The brake beam wear guide 100 is generally U-shape in cross section and includes spaced-apart opposed first and second walls 120 and 140, respectively. The first and second walls 120 and 140 are integrally connected by an interconnecting or end wall 160. The first and second walls 120 and 140 each define cutouts (not labeled) at a front area of the brake beam wear guide 100. The first and second walls 120 and 140 each have a radiused surface that respectively define the cutouts. The cutouts provide clearance for the wheels and for installation and removal of the brake shoes.

The first and second walls 120 and 140 partially define a slide-way 170 between the first wall 120 and the second wall 140 to permit an adequate area for the movement of a lug of a brake beam (such as lug 26 of brake beam 22) as the braking mechanism (such as braking mechanism 20) applies and releases the brakes.

The exterior dimensions of the brake beam wear guide 100 are such as to matingly conform to the pocket defined by the brake beam guide bracket. As shown in a rest position in FIGS. 3 to 10, the first and second walls 120 and 140 slightly diverge, and are configured to be brought into substantial parallel relation when the brake beam wear guide 100 is mounted in a brake beam guide bracket such as in brake beam guide bracket 6 or 7. The memory of the material of the brake beam wear guide 100 will cause the first and second walls 120 and 140 to want to return to their normal or resting position, and in this respect apply a retaining force to assist in holding the brake beam wear guide 100 in position in the brake beam guide bracket.

The first wall 120 also includes outwardly extending detents 138 and 139 configured to mate with indents (not shown) formed in a respective interior surface of one of the inner walls of the brake beam guide bracket. Likewise, the second wall 140 also includes outwardly extending detents 158 and 159 configured to mate with indents (not shown) formed in a respective interior surface of one of the inner walls of the brake beam guide bracket. These detents co-act with the memory characteristics of the brake beam wear guide 100 to retain the brake beam wear guide 100 in position in the brake beam guide bracket.

The first and second walls 120 and 140 also respectively include outwardly extending lips 130 and 150 that assist in properly: (1) seating the brake beam wear guide 100 in the brake beam guide bracket; (2) positioning the brake beam wear guide 100 in the brake beam guide bracket; and (3) positioning the respective detents in the respective indents of the brake beam guide bracket. The first and second walls 120 and 140 do not include lips in the respective defined area of the cutouts.

The first wall 120, the second wall 140, and the end wall 160 of the brake beam wear guide 100 all have the same thickness in this illustrated example embodiment. In other embodiments, one of these walls may be thicker than one or more other such walls.

The first wall 120, the second wall 140, and end wall 160 of the brake beam wear guide 100 are a one piece member monolithically formed from steel in this illustrated example embodiment.

The brake beam wear guide 100 further includes a relatively thick spacer 180 attached to the interior surface of the interconnecting or end wall 160 and positioned between the interior surface of the first wall 120 and the interior surface of the second wall 140. In this illustrated example embodiment, the bottom surface or area of the spacer 180 is permanently bonded to the interior surface of the end wall 160; however, it should be appreciated that the spacer 180 could be attached to the interior surface of end wall 160 in other manners (such as by adhesive or gluing, using counter sunk rivets or other suitable fasteners, or employing a snap fit connection).

In this illustrated example embodiment, the spacer 180 is not directly attached to either of the first wall 120 or the second wall 140. In this illustrated example embodiment, the spacer 180 is spaced apart from each of the first wall 120 or the second wall 140. This configuration enables the first wall 120 and the second wall 140 to move toward each other when the brake beam wear guide 100 is positioned in a brake beam guide bracket as described above. The outer wall 182 of the spacer 180 partially defines the slide-way 170.

In this illustrated example embodiment, the spacer 180 covers a substantial portion of the interior surface of the end wall 160. It should be appreciated that the amount of the interior surface of the end wall 160 covered by the spacer may vary in accordance with the present disclosure.

In this illustrated example embodiment, the spacer 180 is of the same longitudinal length as the first wall 120, the second wall 140, and the end wall 160. It should be appreciated that the length of the spacer may vary in accordance with the present disclosure.

In this illustrated example embodiment, the spacer 180 is of a smaller width than the width of the portion of the end wall 160 from the first wall 120 to the second wall 140. It should be appreciated that the width of the spacer may vary in accordance with the present disclosure.

In this illustrated example embodiment, the spacer 180 is of a smaller thickness or height than each of the first wall 120 and the second wall 140. In this illustrated example embodiment, the spacer 180 is: (a) approximately 15 to 30% of the height of the first portion of the first wall 120 (without the cutout) and the first portion of the second wall 140 (without the cutout); and (b) approximately 30 to 50% of the height of the second portion of first wall 120 (defining the cutout) and the second wall 140 (defining the cutout). It should be appreciated that the thickness or height of the spacer may vary in accordance with the present disclosure.

The first portion first wall 120 (without the cutout) has a height of approximately 3 inches (approximately 7.62 cms), the first portion of the second wall 140 (without the cutout) has a height of approximately 3 inches (approximately 7.62 cms), the second portion first wall 120 (defining the cutout) has a height of approximately 1¾ inches (approximately 4.445 cms), the second portion of the second wall 140 (defining the cutout) has a height of approximately 1¾ inches (approximately 4.445 cms), and of the spacer 180 has a height of approximately ⅝ (approximately 1.5875 cms) of an inch in this illustrated example embodiment.

In this illustrated example embodiment, first wall 120, the second wall 140, and the end wall 60 are made of steel, and the spacer 180 is formed from one insert or single piece of a polymer material. In other embodiments, the spacer is formed from more than one inserts or pieces of material. In such embodiments, the inserts or pieces of material that form the multi-part spacer may be longitudinally adjacent or longitudinally spaced apart.

In this illustrated example embodiment, the spacer 180 has sharp longitudinal and transverse edges. It should be appreciated that the spacer may have one or more curved or radiused edges or other suitable edges in accordance with the present disclosure.

In this illustrated example embodiment, the spacer 180 has uniform dimensions along it longitudinal axis. In other embodiments, the spacer may not have uniform dimensions along it longitudinal axis. For example, the spacer may be tapered from one longitudinal end to the other longitudinal end.

Although not shown, the spacer 180 could include one or more front and back attaching lips that wrap around the front and back longitudinal edges of the end wall 160 to further attach the spacer 180 to the end wall 160.

The example spacer 180 is made from a relatively hard wear resistant polymer in this illustrated example embodiment, and particularly polyurethane having approximately a 75D durometer hardness. It should also be appreciated that the spacer could be made from other materials having a suitable hardness such as but not limited to Ultra High Molecular Weight (UHMW) Polyethylene (PE).

In various embodiments, the example spacer 180 is bonded to the interior surface of the end wall 160 using any suitable bonding method. One such example bonding method includes: (1) grit or sandblasting the interior surface of the end wall 160; (2) applying a suitable primer to the interior surface of the end wall 160; (3) attaching suitable formwork relative to the end wall 160; and (4) using a two-part liquid polyurethane to form the spacer 180 on and bond the spacer 180 to the interior surface of the end wall 180. It should be appreciated that the formwork will provide for the gaps between the spacer and each of the first wall 120 and the second wall 140 in this illustrated example embodiment.

When implemented, it is expected that four brake beam wear guides 100 will be employed in the sets of opposing brake beam guide brackets of the two side frames of a truck.

The spacers 180 of the opposing brake beam wear guides 100 will engage or be engaged by the lugs on opposing ends of the brake beams of the braking mechanisms of the truck. The spacers 180 will function to limit the lateral shifting of brake beam between the two side frames, and specifically in the brake beam guide brackets.

This will reduce the lateral movement of the brake beams from center laterally toward either one of the side frames, and prevent the brake shoes from overhanging the engagement surfaces of the wheels and from contacting with the flanges of the wheels. This will help alleviate uneven brake shoe wear and asymmetric wheel flange wear.

It should further be appreciated that each brake beam lug is made of steel and will engage the interior surfaces of the steel first and second walls 120 and 140 of the brake beam wear guide 100 (i.e., will engage the top and bottom interior surfaces that define the slide-way 170). The center of gravity of the brake beam is expected to be at a distance from the ends of the opposing lugs of the brake beam, such that when installed in an assembled truck, the brake beam will rotate towards the railroad tracks or rails and the lugs will rotate within the respective opposing brake beam wear guide 100. This rotation will cause contact between the lugs of the brake beam and the interior surfaces of the walls 120 and 140 of the brake beam wear guides 100. This orientation will create concentrated contact forces over small areas resulting in high pressure. The rotated brake beam lugs that create the higher contact pressure are expected to result in minimum gouging of walls 120 and 140 (as the brake beam extends or retracts in the longitudinal direction due to the brakes being applied or released) due to the brake beam wear guide 100 being steel (and to not substantially affect the polymer spacer 180 that reduces lateral brake beam movement).

In other example embodiments of the present disclosure, the spacer 180 is made of steel. In certain such embodiments, the end wall can define holes or cavities that enable plug welding of the steel spacer to the end wall. In other such embodiments, the end wall can define counter sunk holes that enable fasteners to be used to secure the steel spacer to the end wall.

Referring now to FIGS. 11 to 17, another example embodiment of the brake beam wear guide of the present disclosure is illustrated and indicated by numeral 1100. This brake beam wear guide 1100 is shown prior to being mounted in a pocket of a brake beam guide bracket such as bracket 6 or 7. The brake beam wear guide 1100 is somewhat M-shape in cross section and includes spaced-apart opposed first and second walls 1120 and 1140, respectively. The first and second walls 1120 and 1140 are integrally connected by an interconnecting or end wall 1160 that partially functions as a spacer.

The first and second walls 1120 and 1140 and part of the interconnecting or end wall 1160 define a slide-way 1170 between the first wall 1120 and the second wall 1140 to permit an adequate area for the movement of lug of a brake beam as the braking mechanism applies and releases the brakes.

The exterior dimensions of the brake beam wear guide 1100 are such as to matingly conform to the pocket of a brake beam guide bracket. As shown in a rest position in FIGS. 11 to 17, the first and second walls 1120 and 1140 slightly diverge, and are brought into substantial parallel relation when the brake beam wear guide 1100 is mounted in a brake beam guide bracket such as brake beam guide brackets 6 or 7. The memory of the brake beam wear guide 1100 will cause the first and second walls 1120 and 1140 to want to return to their normal or resting position, and in this respect apply a retaining force to assist in holding the brake beam wear guide 1100 in position in the brake beam guide bracket.

The first wall 1120 also includes outwardly extending detents 1138 and 1139 configured to mate with indents (not shown) formed in a respective interior surface of one of the inner walls of the brake beam guide bracket. Likewise, the second wall 1140 also includes outwardly extending detents 1158 and 1159 configured to mate with indents (not shown) formed in a respective interior surface of one of the inner walls of the brake beam guide bracket. These detents co-act with the memory characteristics of the brake beam wear guide 1100 to retain the brake beam wear guide 1100 in position in the brake beam guide bracket.

The first and second walls 1120 and 1140 respectively include outwardly extending lips 1130 and 1150 that assist in properly: (1) seating the brake beam wear guide 1100 in the brake beam guide bracket; (2) positioning the brake beam wear guide 1100 in the brake beam guide bracket; and (3) positioning the respective detents in the respective indents of the brake beam guide bracket.

The first wall 1120, the second wall 1140, and the end wall 1160 of the brake beam wear guide 1100 all have the same thickness, in this illustrated example embodiment. In other embodiments, one of these walls may be thicker than one or more other such walls.

The first wall 1120, the second wall 1140, and the end wall 1160 of the brake beam wear guide 1100 are a one piece member monolithically formed from steel in this illustrated example embodiment.

In this illustrated example embodiment, the end wall 1160 incudes: (1) a longitudinally extending first section 1162; (2) a longitudinally extending second section 1164; (3) a longitudinally extending third section 1166; (4) a longitudinally extending fourth section 1168; and (5) a longitudinally extending fifth section 1169.

The first section 1162 is integrally connected to and formed with a bottom portion of the first wall 1120 and is integrally connected to and formed with the second section 1164. The first section 1162 extends inwardly from the first wall 1120 toward the second wall 1140.

The second section 1164 is integrally connected to and formed with the first section 1162 and is integrally connected to and formed with the third section 1166. The second section 1164 extends inwardly from the first section 1162 toward the lip 1150 of the second wall 1140.

The third section 1166 is integrally connected to and formed with the second section 1164 and is integrally connected to and formed with the fourth section 1168. The third section 1164 extends inwardly toward the first wall 1120 (from the fourth section 1168) and extends inwardly toward the second wall 1140 (from the second section 1164). The third section 1166 extends in a plane closer to the lips 1130 and 1150 than the plane in which first section 1162 and the fifth section 1169 extend. The third section 1166 partially defines the slide-way 1170 and is configured to engage and be engaged with the end of a lug of a brake beam.

The fourth section 1168 is integrally connected to and formed with the third section 1166 and is integrally connected to and formed with the fifth section 1169. The fourth section 1168 extends inwardly from the fifth section 1169 toward the lip 1130 of the first wall 1120.

The fifth section 1169 is integrally connected to and formed with the fourth section 1168 and is integrally connected to and formed with a bottom portion of the second wall 1140. The fifth section 1169 extends inwardly from the second wall 1140 toward the first wall 1240.

The longitudinally extending second section 1164, the longitudinally extending third section 1166, and the longitudinally extending fourth section 1168, thus co-act to define the spacer 1180.

In this illustrated example embodiment, the second, third, and fourth sections 1164, 1166, and 1168 of the spacer 1180 are spaced apart from each of the first wall 1120 or the second wall 1140. This configuration enables the first wall 1120 and the second wall 1140 to move toward each other when the brake beam wear guide 1100 is positioned in a brake beam guide bracket as described above.

In this illustrated example embodiment, the spacer 1180 is of the same longitudinal length as the first wall 1120 and the second wall 1140. It should be appreciated that the length of the spacer may vary in accordance with the present disclosure.

In this illustrated example embodiment, the second, third, and fourth sections 1164, 1166, and 1168 of the spacer 1180 are of a smaller width than the width from the first wall 1120 to the second wall 1140. It should be appreciated that the width of the second, third, and fourth sections 1164, 1166, and 1168 of the spacer 1180 may vary in accordance with the present disclosure.

In this illustrated example embodiment, the spacer 1180 is of a smaller thickness or height than the first wall 1120 and the second wall 1140. In this illustrated example embodiment, the spacer 1180 is: (a) approximately 15 to 30% of the height of the first portion of the first wall 1120 (without the cutout) and the first portion of the second wall 1140 (without the cutout); and (b) approximately 30 to 50% of the height of the second portion of first wall 1120 (defining the cutout) and the second wall 1140 (defining the cutout). It should be appreciated that the thickness or height of the spacer may vary in accordance with the present disclosure.

The first portion first wall 1120 (without the cutout) has a height of approximately 3 inches (approximately 7.62 cms), the first portion of the second wall 1140 (without the cutout) has a height of approximately 3 inches (approximately 7.62 cms), the second portion first wall 1120 (defining the cutout) has a height of approximately 1¾ inches (approximately 4.445 cms), the second portion of the second wall 1140 (defining the cutout) has a height of approximately 1¾ inches (approximately 4.445 cms), and third section of the spacer 1166 has a height of approximately ⅝ (approximately 1.5875 cms) of an inch in this illustrated example embodiment.

In this illustrated example embodiment, the spacer 1180 which is part of the end wall 1160 is formed from one piece of material as described above. The example spacer 1180 is made from the same steel as the walls 1120, 1140, and 1160 in this illustrated example embodiment. In other embodiments, the spacer could be made from other materials having a suitable hardness. In other embodiments, the spacer is formed from more than one piece of material. In such embodiments, the pieces of material that form the spacer may be longitudinally adjacent or longitudinally spaced apart.

In this illustrated example embodiment, the spacer 1180 does not have sharp longitudinal edges. It should be appreciated that the spacer may have one or more sharp edges or other suitable edges in accordance with the present disclosure.

In this illustrated example embodiment, the spacer 1180 has uniform dimensions along it longitudinal axis. In other embodiments, the spacer may have not uniform dimensions along it longitudinal axis. For example, the spacer may be tapered from one longitudinal end to the other longitudinal end.

When implemented, it is expected that four brake beam wear guides 1100 will be employed in the sets of opposing brake beam guide brackets of the two side frames of a truck.

The spacers 1180 of the opposing brake beam wear guides 1100 will engage or be engaged by the lugs on opposing ends of the brake beams of the braking mechanisms of the truck. The spacers 1180 will function to limit the lateral shifting of brake beams between the two side frames, and specifically in the brake beam guide brackets.

This will reduce the lateral movement of the brake beam from center laterally toward one of the side frames, and prevent the brake shoes (attached to the brake beams) from overhanging the engagement surface of the wheels and from contacting with the flanges of the wheels. This will help alleviate uneven brake shoe wear and asymmetric wheel flange wear.

As mentioned above, it should be appreciated that the wear guides described herein may be employed for other uses besides for railroad car trucks.

It will be understood that modifications and variations may be effected without departing from the scope of the novel concepts of the present invention, and it is understood that this application is to be limited only by the scope of the claims.

The invention claimed is:

1. A railroad car brake beam wear guide, comprising:
a first wall;
a second wall spaced apart from the first wall;
an end wall monolithically formed with and connecting the first wall and the second wall, wherein the first wall and the second wall with the end wall therebetween form a U-shape extending longitudinally from a front of the wear guide to a back of the wear guide;
a polymer spacer integrally attached to an interior surface of the end wall, wherein the first wall, the second wall, and the spacer define a slide-way configured to permit movement of a lug of a brake beam in the slide-way, wherein the spacer is configured to limit lateral movement of the brake beam, and wherein an end wall thickness and a spacer thickness combine to provide a spacer and end wall combined thickness that is uniform extending longitudinally from the front of the wear guide to the back of the wear guide;
a first gap between the first wall and the spacer, the first gap extending away from a first gap bottom at the interior surface of the end wall to a first gap height such that the spacer is not in contact with the first wall; and
a second gap between the second wall and the spacer, the second gap extending away from a second gap bottom at the interior surface of the end wall to a second gap height such that the spacer is not in contact with the second wall, wherein the first gap bottom and the second gap bottom each extend longitudinally from the front of the wear guide to the back of the wear guide, and wherein the first gap bottom and the second gap bottom each extend longitudinally parallel to a bottom surface of the end wall that is opposite the interior surface of the end wall and that extends longitudinally from the front of the wear guide to the back of the wear guide.

2. The railroad car brake beam wear guide of claim 1, wherein the spacer is bonded to the interior surface of the end wall.

3. The railroad car brake beam wear guide of claim 1, wherein the spacer is not directly attached to either of the first wall or the second wall.

4. The railroad car brake beam wear guide of claim 1, wherein the spacer is spaced apart from each of the first wall and the second wall.

5. The railroad car brake beam wear guide of claim 1, wherein the spacer covers a substantial portion of the interior surface of the end wall.

6. The railroad car brake beam wear guide of claim 1, wherein the spacer is of a same longitudinal length as the end wall.

7. The railroad car brake beam wear guide of claim 1, wherein the spacer is of a smaller height than the first wall and the second wall.

8. The railroad car brake beam wear guide of claim 1, wherein the spacer has a uniform thickness.

9. A wear guide, comprising:
a first wall;
a second wall spaced apart from the first wall;
an end wall monolithically formed with and connecting the first wall and the second wall, wherein the first wall and the second wall with the end wall therebetween form a U-shape extending longitudinally from a front of the wear guide to a back of the wear guide;
a polymer spacer integrally attached to an interior surface of the end wall, wherein the first wall, the second wall, and the spacer define a slide-way configured to permit movement of a lug in the slide-way, and wherein an end wall thickness and a spacer thickness combine to provide a spacer and end wall combined thickness that is uniform extending longitudinally from the front of the wear guide to the back of the wear guide;
a first gap between the first wall and the spacer, the first gap extending away from a first gap bottom at the interior surface of the end wall to a first gap height such that the spacer is not in contact with the first wall; and
a second gap between the second wall and the spacer, the second gap extending away from a second gap bottom at the interior surface of the end wall to a second gap height such that the spacer is not in contact with the second wall, wherein the first gap bottom and the second gap bottom each extend longitudinally from the front of the wear guide to the back of the wear guide, and wherein the first gap bottom and the second gap bottom each extend longitudinally parallel to a bottom surface of the end wall that is opposite the interior surface of the end wall and that extends longitudinally from the front of the wear guide to the back of the wear guide.

10. The wear guide of claim 9, wherein the spacer is bonded to the interior surface of the end wall.

11. The wear guide of claim 9, wherein the spacer is not directly attached to either of the first wall or the second wall.

12. The wear guide of claim 9, wherein the spacer is spaced apart from each of the first wall and the second wall.

13. The railroad car brake beam wear guide of claim 8, wherein the spacer is of a smaller height than the first wall and the second wall, wherein the spacer thickness is greater than the end wall thickness, and wherein the spacer thickness is less than a spacer length transverse to the spacer thickness and extending between the front of the wear guide and the back of the wear guide.

14. The wear guide of claim 9, wherein the spacer has a uniform thickness, wherein the spacer is of a smaller height than the first wall and the second wall, wherein the spacer thickness is greater than the end wall thickness, and wherein the spacer thickness is less than a spacer length transverse to the spacer thickness and extending between the front of the wear guide and the back of the wear guide.

* * * * *